(12) United States Patent
Shirai

(10) Patent No.: US 9,452,798 B2
(45) Date of Patent: Sep. 27, 2016

(54) BICYCLE SEATPOST ASSEMBLY

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 21 days.

(21) Appl. No.: 14/529,376

(22) Filed: Oct. 31, 2014

(65) Prior Publication Data

US 2016/0121952 A1 May 5, 2016

(51) Int. Cl.
*F16M 11/00* (2006.01)
*B62J 1/08* (2006.01)

(52) U.S. Cl.
CPC ............. *B62J 1/08* (2013.01); *B62J 2001/085* (2013.01)

(58) Field of Classification Search
CPC .............................. B62J 1/08; B62J 2001/085
USPC ....... 248/161, 158, 560, 568, 569, 573, 574; 297/215.13, 344.19, 339
See application file for complete search history.

(56) References Cited

U.S. PATENT DOCUMENTS

| | | | | |
|---|---|---|---|---|
| 5,127,804 A * | 7/1992 | Chappell | ................. | B62J 11/02 280/201 |
| 6,070,895 A * | 6/2000 | Newman | .................. | B62J 1/08 280/283 |
| 6,474,619 B1 * | 11/2002 | Ma | ......................... | A47B 9/20 248/132 |
| 6,648,027 B1 * | 11/2003 | Didur | .................... | B60C 29/064 141/38 |
| 8,328,454 B2 * | 12/2012 | McAndrews | .............. | B62J 1/08 297/215.13 |
| 8,894,025 B2 * | 11/2014 | Wehage | ..................... | B62J 1/06 248/157 |
| 2013/0221713 A1 * | 8/2013 | Pelot | ........................ | B62J 1/02 297/215.13 |

FOREIGN PATENT DOCUMENTS

| | | |
|---|---|---|
| DE | 1550452 | 8/1969 |
| DE | 102008053092 B4 | 4/2010 |
| EP | 2594468 | 5/2013 |

* cited by examiner

*Primary Examiner* — Mark Wendell
(74) *Attorney, Agent, or Firm* — Mori & Ward, LLP

(57) ABSTRACT

A bicycle seatpost assembly comprises a first cylinder, a second cylinder, and a positioning structure. The second cylinder is configured to be telescopically received in the first cylinder. The positioning structure is configured to relatively position the first cylinder and the second cylinder. The positioning structure includes a receiving member, a first seal member, and a movable member. The first seal member is configured to provide a first gate of a first passageway together with the receiving member. The first seal member includes a spherical surface contactable with the receiving member to close the first gate. The movable member is configured to move the first seal member relative to the receiving member to open the first gate.

25 Claims, 11 Drawing Sheets

BICYCLE SEATPOST ASSEMBLY

BACKGROUND OF THE INVENTION

1. Field of the Invention

The present invention relates to a bicycle seatpost assembly.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle seatpost assembly.

SUMMARY OF THE INVENTION

In accordance with a first aspect of the present invention, a bicycle seatpost assembly comprises a first cylinder, a second cylinder, and a positioning structure. The second cylinder is configured to be telescopically received in the first cylinder. The positioning structure is configured to relatively position the first cylinder and the second cylinder. The positioning structure includes a receiving member, a first seal member, and a movable member. The first seal member is configured to provide a first gate of a first passageway together with the receiving member. The first seal member includes a spherical surface contactable with the receiving member to close the first gate. The movable member is configured to move the first seal member relative to the receiving member to open the first gate.

In accordance with a second aspect of the present invention, the bicycle seatpost assembly according to the first aspect is configured so that the receiving member includes a tapered surface contactable with the spherical surface.

In accordance with a third aspect of the present invention, the bicycle seatpost assembly according to the first aspect is configured so that the receiving member is made of a first material comprising a resin material.

In accordance with a fourth aspect of the present invention, the bicycle seatpost assembly according to the first aspect is configured so that the first seal member is made of a second material comprising a metallic material.

In accordance with a fifth aspect of the present invention, the bicycle seatpost assembly according to the first aspect is configured so that the first seal member is a sphere.

In accordance with a sixth aspect of the present invention, the bicycle seatpost assembly according to the first aspect is configured so that the movable member is a separate member from the first seal member.

In accordance with a seventh aspect of the present invention, the bicycle seatpost assembly according to the first aspect is configured so that the movable member is configured to press the first seal member to move away from the receiving member so that the first gate is open.

In accordance with an eighth aspect of the present invention, the bicycle seatpost assembly according to the first aspect is configured so that the positioning structure includes a valve biasing member configured to bias the first seal member toward the receiving member so that the spherical surface is in contact with the receiving member.

In accordance with a ninth aspect of the present invention, the bicycle seatpost assembly according to the first aspect is configured so that the first seal member is provided on an opposite side of the movable member relative to the receiving member.

In accordance with a tenth aspect of the present invention, the bicycle seatpost assembly according to the ninth aspect is configured so that the positioning structure includes a valve biasing member configured to bias the first seal member toward the receiving member so that the spherical surface is in contact with the receiving member.

In accordance with an eleventh aspect of the present invention, the bicycle seatpost assembly according to the first aspect is configured so that the positioning structure includes a support member configured to movably support the movable member. The movable member is movable relative to the support member between a closed position where the first seal member is in contact with the receiving member to close the first gate, and a first open position where the movable member moves the first seal member so that the first seal member is spaced apart from the receiving member to open the first gate.

In accordance with a twelfth aspect of the present invention, the bicycle seatpost assembly according to the eleventh aspect is configured so that the positioning structure includes a second seal member configured to provide a second gate of a second passageway together with the movable member. The movable member is movable relative to the support member between the closed position where the movable member is in contact with the second seal member to close the second gate, and a second open position where the movable member is spaced apart from the second seal member to open the second gate. The movable member is configured to be provided at the second open position so that the first seal member is in contact with the receiving member to close the first gate.

In accordance with a thirteenth aspect of the present invention, the bicycle seatpost assembly according to the twelfth aspect is configured so that the second open position is provided between the closed position and the first open position in a movement direction of the movable member.

In accordance with a fourteenth aspect of the present invention, the bicycle seatpost assembly according to the twelfth aspect is configured so that the support member has a tubular shape. The movable member is movably provided in the support member. The second passageway is at least partially provided radially outward of the support member.

In accordance with a fifteenth aspect of the present invention, a bicycle seatpost assembly comprises a receiving member, a first seal member, and a movable member. The first seal member is configured to provide a first gate of a first passageway together with the receiving member. The first seal member is contactable with the receiving member to close the first gate. The movable member is configured to move the first seal member relative to the receiving member to open the first gate. The movable member is a separate member from the first seal member.

In accordance with a sixteenth aspect of the present invention, the bicycle seatpost assembly according to the fifteenth aspect is configured so that the movable member is configured to press the first seal member to move away from the receiving member so that the first gate is open.

In accordance with a seventeenth aspect of the present invention, the bicycle seatpost assembly according to the fifteenth aspect is configured so that the positioning structure includes a valve biasing member configured to bias the first seal member toward the receiving member so that the first seal member is in contact with the receiving member.

In accordance with an eighteenth aspect of the present invention, the bicycle seatpost assembly according to the fifteenth aspect is configured so that the first seal member is provided on an opposite side of the movable member relative to the receiving member.

In accordance with a nineteenth aspect of the present invention, the bicycle seatpost assembly according to the eighteenth aspect is configured so that the positioning structure includes a valve biasing member configured to bias the first seal member toward the receiving member so that the first seal member is in contact with the receiving member.

In accordance with a twentieth aspect of the present invention, the bicycle seatpost assembly according to the fifteenth aspect is configured so that the positioning structure includes a support member configured to movably support the movable member. The movable member is movable relative to the support member between a closed position where the first seal member is in contact with the receiving member to close the first gate, and a first open position where the movable member moves the first seal member so that the first seal member is spaced apart from the receiving member to open the first gate.

In accordance with a twenty-first aspect of the present invention, the bicycle seatpost assembly according to the twentieth aspect is configured so that the positioning structure includes a second seal member configured to provide a second gate of a second passageway together with the movable member. The movable member is movable relative to the support member between the closed position where the movable member is in contact with the second seal member to close the second gate, and a second open position where the movable member is spaced apart from the second seal member to open the second gate. The movable member is configured to be provided at the second open position so that the first seal member is in contact with the receiving member to close the first gate.

In accordance with a twenty-second aspect of the present invention, the bicycle seatpost assembly according to the twenty-first aspect is configured so that the second open position is provided between the closed position and the first open position in a movement direction of the movable member.

In accordance with a twenty-third aspect of the present invention, the bicycle seatpost assembly according to the twenty-first aspect is configured so that the support member has a tubular shape. The movable member is movably provided in the support member. The second passageway is at least partially provided radially outward of the support member in a movement direction of the movable member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
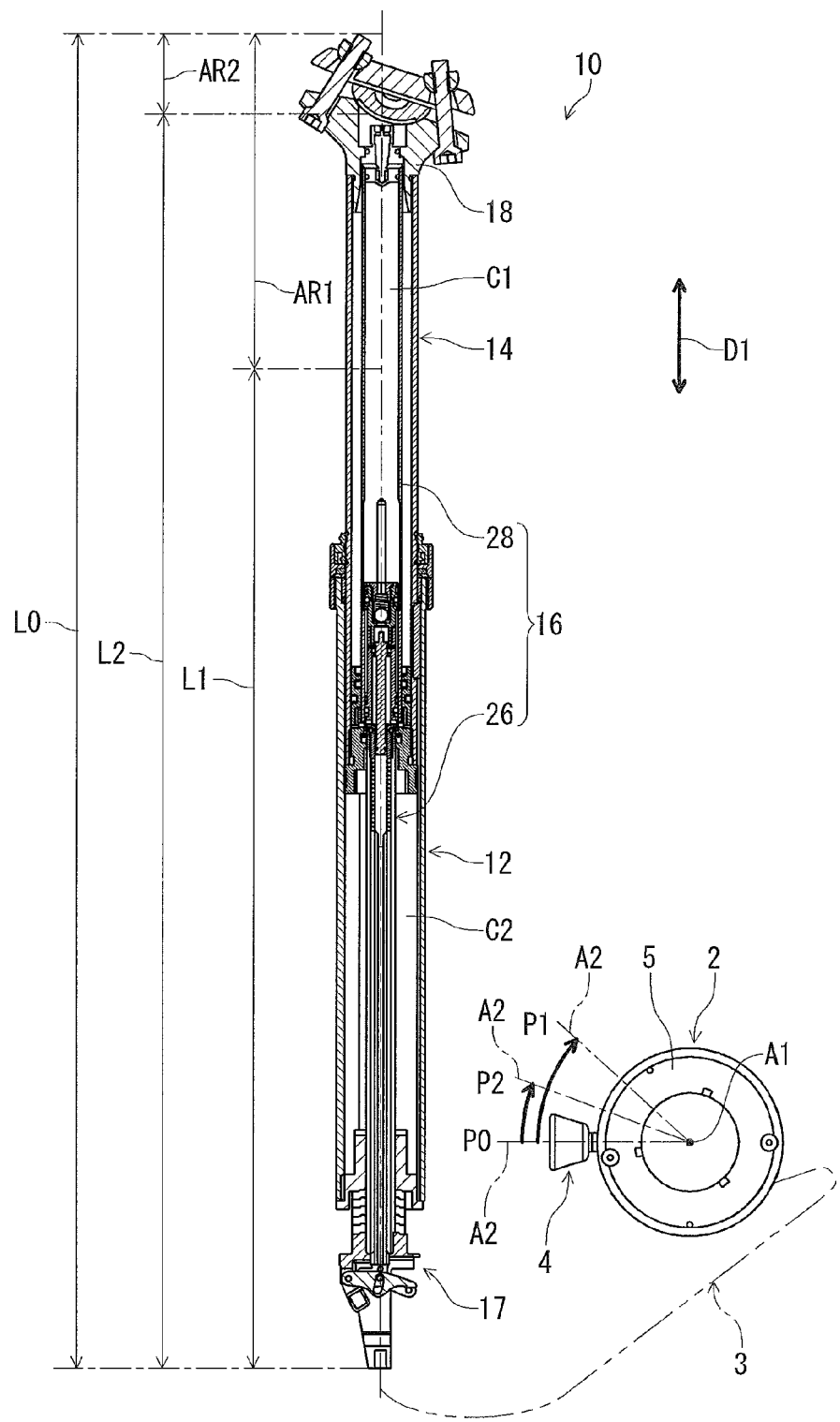
FIG. 1 is a cross-sectional view of a bicycle seatpost assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle seatpost assembly 10 in accordance with a first embodiment comprises a first cylinder 12, a second cylinder 14, and a positioning structure 16. The second cylinder 14 is configured to be telescopically received in the first cylinder 12. The first cylinder 12 and the second cylinder 14 are configured to be movable relative to each other in a telescopic direction D1.

The positioning structure 16 is configured to relatively position the first cylinder 12 and the second cylinder 14. The positioning structure 16 is configured to be operated via an operating device 2. In the illustrated embodiment, the bicycle seatpost assembly 10 further comprises a valve operating structure 17 attached to a lower end of the first cylinder 12. The valve operating structure 17 is configured to transmit operation of the operating device 2 from the operation cable 3 to the positioning structure 16.

In the present application, the following directional terms "forward", "rearward", "left", "right", "upward" and "downward" as well as any other similar directional terms refer to those directions which are determined on the basis of the rider who sits on a bicycle seat (not shown) of a bicycle with facing a bicycle handlebar (not shown). Accordingly, these terms, as utilized to describe the bicycle seatpost assembly 10, should be interpreted relative to a bicycle equipped with the bicycle seatpost assembly 10 as used in an upright riding position on a horizontal surface.

As seen in FIG. 1, the operating device 2 is configured to output a first operation and a second operation different from the first operation. More specifically, the operating device 2 includes an operated member 4 and a base member 5. The operated member 4 is configured to be pivotable relative to the base member 5 from a rest position P0 to a first operated position P1 about a pivot axis A1. The operated member 4 is configured to be pivotable relative to the base member 5 from the rest position P0 to a second operated position P2 about the pivot axis A1. The second operated position P2 is defined between the rest position P0 and the first operated position P1. Each of the rest position P0, the second operated position P2, and the first operated position P1 is defined based on a center axis A2 of the operated member 4.

The operation cable 3 is pulled by a first amount of operation when the operated member 4 is pivoted from the rest position P0 to the first operated position P1. The operation cable 3 is pulled by a second amount of operation when the operated member 4 is pivoted from the rest position P0 to the second operated position P2. The second amount of operation is different from the first amount of operation.

The first cylinder 12 is detachably attached to a seat tube (not shown). The second cylinder 14 includes a seat attachment portion 18 to which a bicycle seat (not shown) is to be attached. However, the second cylinder 14 can be detachably attached to the seat tube and the bicycle seat can be attached to the first cylinder 12 if needed and/or desired.

As seen in FIG. 1, the bicycle seatpost assembly 10 has a maximum overall length L0 and a minimum overall length L1. The overall length of the bicycle seatpost assembly 10 is adjustable within a first adjustable range AR1 defined as a difference between the maximum overall length L0 and the minimum overall length L1. The bicycle seatpost assembly 10 has an intermediate overall length L2. The intermediate overall length L2 is defined between the maximum overall length L0 and the minimum overall length L1.

In the illustrated embodiment, the bicycle seatpost assembly 10 has a locked state, a first adjustable state, and a second adjustable state. In the locked state, the overall length of the bicycle seatpost assembly 10 is maintained at an adjusted overall length. In the locked state, the first cylinder 12 and the second cylinder 14 are fixedly positioned relative to each other in the telescopic direction D1.

In the first adjustable state, the overall length of the bicycle seatpost assembly 10 is continuously adjustable within the first adjustable range AR1 by operating the operated member 4 to the first operated position P1. Namely, in the first adjustable state, the positional relationship between the first cylinder 12 and the second cylinder 14 is continuously adjustable within the first adjustable range AR1.

In the second adjustable state, the overall length of the bicycle seatpost assembly 10 is adjustable to the intermediate overall length L2 by just operating the operated member 4 of the operating device 2 to the second operated position P2. More specifically, in the second adjustable state, the second cylinder 14 stops relative to the first cylinder 12 at a position corresponding to the intermediate overall length L2 when the second cylinder 14 downwardly moves relative to the first cylinder 12 from a position corresponding to the maximum overall length L0.

Furthermore, in the second adjustable state, the overall length of the bicycle seatpost assembly 10 is continuously adjustable within a second adjustable range AR2 by operating the operated member 4 of the operating device 2 to the second operated position P2. Namely, in the second adjustable state, the positional relationship between the first cylinder 12 and the second cylinder 14 is continuously adjustable within the second adjustable range AR2. The second adjustable range AR2 is defined as a difference between the maximum overall length L0 and the intermediate overall length L2.

As seen in FIG. 1, the first adjustable range AR1 and the second adjustable range AR2 are different from each other. More specifically, the second adjustable range AR2 at least partially overlaps with the first adjustable range AR1. In the illustrated embodiment, the second adjustable range AR2 entirely overlaps with the first adjustable range AR1 and is included in the first adjustable range AR1. The first adjustable range AR1 partially overlaps with the second adjustable range AR2.

The second adjustable range AR2 has a total length different from a total length of the first adjustable range AR1. In the illustrated embodiment, the total length of the second adjustable range AR2 is shorter than the total length of the first adjustable range AR1.

The positioning structure 16 is configured to switch a state of the bicycle seatpost assembly 10 among the locked state, the second adjustable state, and the first adjustable state in response to the operation of the operating device 2.

Figure 2:
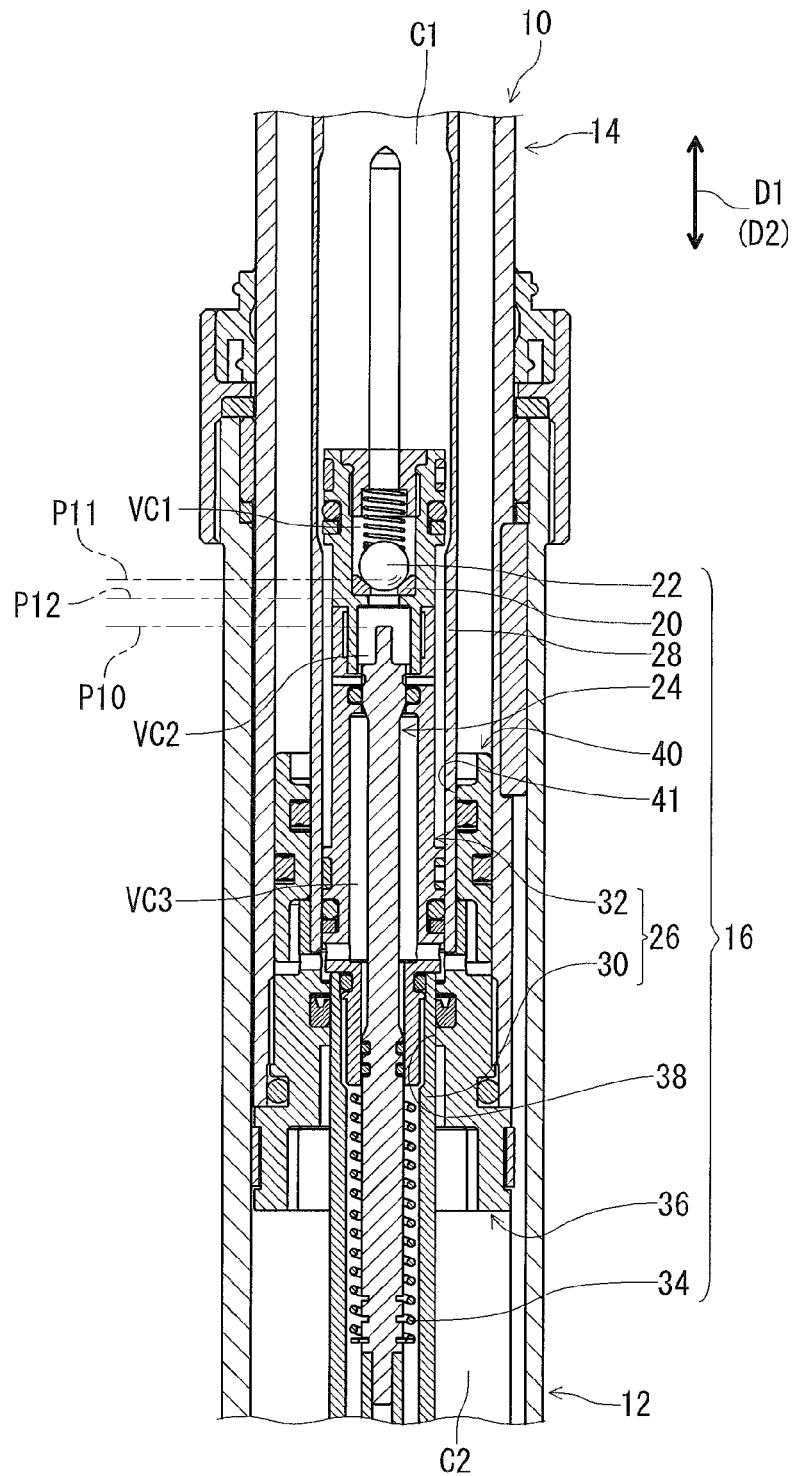
FIG. 2 is a partial cross-sectional view of the bicycle seatpost assembly illustrated in FIG. 1 (a closed position)

As seen in FIG. 2, the positioning structure 16 includes a receiving member 20, a first seal member 22, and a movable member 24. Namely, the bicycle seatpost assembly 10 comprises the receiving member 20, the first seal member 22, and the movable member 24.

The positioning structure 16 includes a support member 26 configured to movably support the movable member 24. The support member 26 has a tubular shape. The movable member 24 is movably provided in the support member 26. In the illustrated embodiment, the movable member 24 is movable relative to the support member 26 in the telescopic direction D1.

As seen in FIG. 2, the positioning structure 16 includes an inner tube 28. The support member 26 is configured to be telescopically movable relative to the inner tube 28. The support member 26 and the inner tube 28 extend in the telescopic direction D1. The support member 26 is provided in the first cylinder 12. A lower end of the support member 26 is secured to the valve operating structure 17 (FIG. 1). The support member 26 is integrally movable with the first cylinder 12 relative to the second cylinder 14 in the telescopic direction D1. The inner tube 28 is provided in the second cylinder 14. An upper end of the inner tube 28 is secured to the seat attachment portion 18 (FIG. 1). The inner tube 28 is integrally movable with the second cylinder 14 relative to the first cylinder 12 in the telescopic direction D1. The support member 26 can be provided in the second cylinder 14 and the inner tube 28 can be provided in the first cylinder 12 if needed and/or desired.

As seen in FIG. 2, the support member 26 includes a support tube 30 and a valve support 32. The support tube 30 extends in the telescopic direction D1. The valve support 32 is secured to an upper end of the support tube 30 and is movably provided in the inner tube 28. The movable member 24 is movably provided in the support tube 30 and the valve support 32. The valve support 32 includes a first valve chamber VC1, a second valve chamber VC2, and a third valve chamber VC3. The second valve chamber VC2 is provided between the first valve chamber VC1 and the third valve chamber VC3 in the telescopic direction D1. The first seal member 22 is provided in the first valve chamber VC1. The movable member 24 is movably provided in the second valve chamber VC2 and the third valve chamber VC3.

The first seal member 22, the support member 26, and the movable member 24 constitute a valve structure. The valve structure has a closed state (FIG. 3), a first open state (FIG. 4) and a second open state (FIG. 5). The closed state corresponds to the locked state of the bicycle seatpost assembly 10. The first open state corresponds to the first adjustable state of the bicycle seatpost assembly 10. The second open state corresponds to the second adjustable state of the bicycle seatpost assembly 10.

As seen in FIG. 2, the movable member 24 is configured to be positioned at a closed position P10, a first open position P11, and a second open position P12. The closed position P10, the first open position P11, and the second open position P12 are defined by a position of an upper tip end of the movable member 24 in the telescopic direction D1. In the closed state of the valve structure, the movable member 24 is positioned at the closed position P10. In the first open state of the valve structure, the movable member 24 is positioned at the first open position P11. In the second open state of the valve structure, the movable member 24 is positioned at the second open position P12.

The second open position P12 is provided between the closed position P10 and the first open position P11 in a movement direction D2 of the movable member 24. While the movement direction D2 of the movable member 24 coincides with the telescopic direction D1 of the bicycle seatpost assembly 10, the movement direction D2 can be different from the telescopic direction D1.

The positioning structure 16 includes a biasing element 34 configured to bias the movable member 24 relative to the support member 26 toward the closed position P10. The movable member 24 is configured to be positioned at the closed position P10 by a biasing force of the biasing element 34. The movable member 24 is moved from the closed position P10 toward the first open position P11 relative to the support member 26 against a biasing force of the biasing element 34. The position of the movable member 24 is continuously adjustable relative to the support member 26 between the closed position P10 and the first open position P11 using the operating device 2 (FIG. 1).

As seen in FIG. 2, the movable member 24 is positioned at the closed position P10 in a state where the operated member 4 of the operating device 2 is disposed at the rest position P0 (FIG. 1). The movable member 24 is positioned at the first open position P11 via the operation cable 3 and the valve operating structure 17 (FIG. 1) in a state where the operated member 4 of the operating device 2 is disposed at the first operated position P1 (FIG. 1). The movable member 24 is positioned at the second open position P12 via the valve operating structure 17 and the operation cable 3 in a state where the operated member 4 of the operating device 2 is disposed at the second operated position P2 (FIG. 1).

As seen in FIG. 2, the positioning structure 16 includes a sealing structure 36 having an annular shape. The sealing structure 36 is secured to a lower end of the second cylinder 14. A lower end of the inner tube 28 is secured to the sealing structure 36. Namely, the inner tube 28 and the sealing structure 36 are integrally movable with the second cylinder 14 relative to the first cylinder 12 in the telescopic direction D1. The sealing structure 36 includes a guide hole 38 extending in the telescopic direction D1. The support member 26 extends through the guide hole 38 of the sealing structure 36 in the telescopic direction D1.

The positioning structure 16 includes a piston 40 having an annular shape. The piston 40 is provided between the second cylinder 14 and the inner tube 28 in a radial direction of the piston 40. The piston 40 includes a guide hole 41 extending in the telescopic direction D1. The inner tube 28 extends through the guide hole 41 of the piston 40 in the telescopic direction D1. The piston 40 is movable relative to the second cylinder 14 and the inner tube 28 in the telescopic direction D1.

As seen in FIG. 2, the positioning structure 16 includes a first chamber C1 and a second chamber C2. The first chamber C1 is defined by the support member 26, the inner tube 28, and the seat attachment portion 18 (FIG. 1). The second chamber C2 is defined by the first cylinder 12, the support member 26, the sealing structure 36, and the valve operating structure 17 (FIG. 1). The first chamber C1 is filled with a substantially incompressible fluid (e.g., oil), for example. The second chamber C2 is in communication with an outside of the bicycle seatpost assembly 10, for example.

Figure 3:
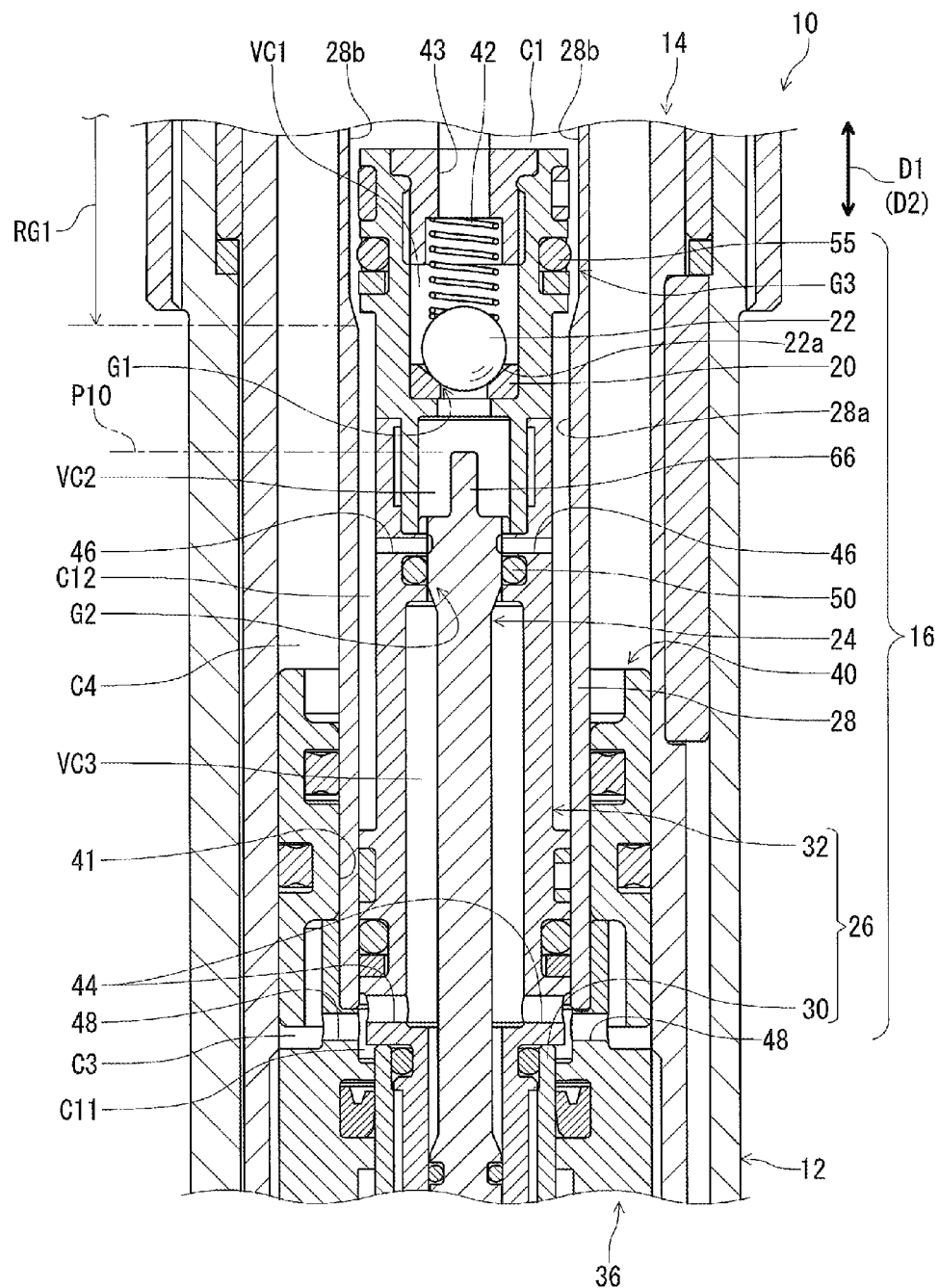
FIG. 3 is an enlarged partial cross-sectional view of the bicycle seatpost assembly illustrated in FIG. 1 (the closed position)

As seen in FIG. 3, a third chamber C3 is defined by the second cylinder 14, the inner tube 28, the sealing structure 36, and the piston 40. A first intermediate chamber C11 is defined by the inner tube 28, the support member 26, and the sealing structure 36. A second intermediate chamber C12 is defined by the support member 26 and the inner tube 28. Each of the third chamber C3, the first intermediate chamber C11, and the second intermediate chamber C12 is filled with the substantially incompressible fluid (e.g., oil), for example.

A biasing chamber C4 is defined by the second cylinder 14, the inner tube 28, the piston 40, and the seat attachment portion 18 (FIG. 1). A compressible fluid (e.g., air or gas other than air) is filled in the biasing chamber C4. The biasing chamber C4 is configured to apply a biasing force to the piston 40 so that the second cylinder 14 upwardly moves relative to the first cylinder 12 in the telescopic direction D1. The compressible fluid is compressed in the biasing chamber C4 in a state where the overall length of the bicycle seatpost assembly 10 is the maximum overall length L0 (FIG. 1).

As seen in FIG. 3, the movable member 24 is a separate member from the first seal member 22. The first seal member 22 is provided on an opposite side of the movable member 24 relative to the receiving member 20. The movable member 24 is spaced apart from the first seal member 22 in the telescopic direction D1 in the closed state where the movable member 24 is disposed at the closed position P10. The receiving member 20 is provided between the first seal member 22 and the movable member 24 in the telescopic direction D1 in the closed state where the movable member 24 is disposed at the closed position P10. While the movable member 24 is a separate member from the first seal member 22, the movable member 24 can be integrally provided with the first seal member 22 as a single unitary member so as to move together with the first seal member 22.

As seen in FIG. 3, the positioning structure 16 includes a valve biasing member 42 configured to bias the first seal member 22 toward the receiving member 20 so that the spherical surface 22a is in contact with the receiving member 20. The movable member 24 is configured to move the first seal member 22 relative to the receiving member 20 against a biasing force of the valve biasing member 42 to open the first gate G1. The first seal member 22 is provided between the receiving member 20 and the valve biasing member 42 in the telescopic direction D1. The first seal member 22 is provided between the movable member 24 and the valve biasing member 42 in the telescopic direction D1. The valve biasing member 42 is provided in the first valve chamber VC1. While the valve biasing member 42 is a spring, the valve biasing member 42 can be a biasing member other than the spring.

Figure 4:
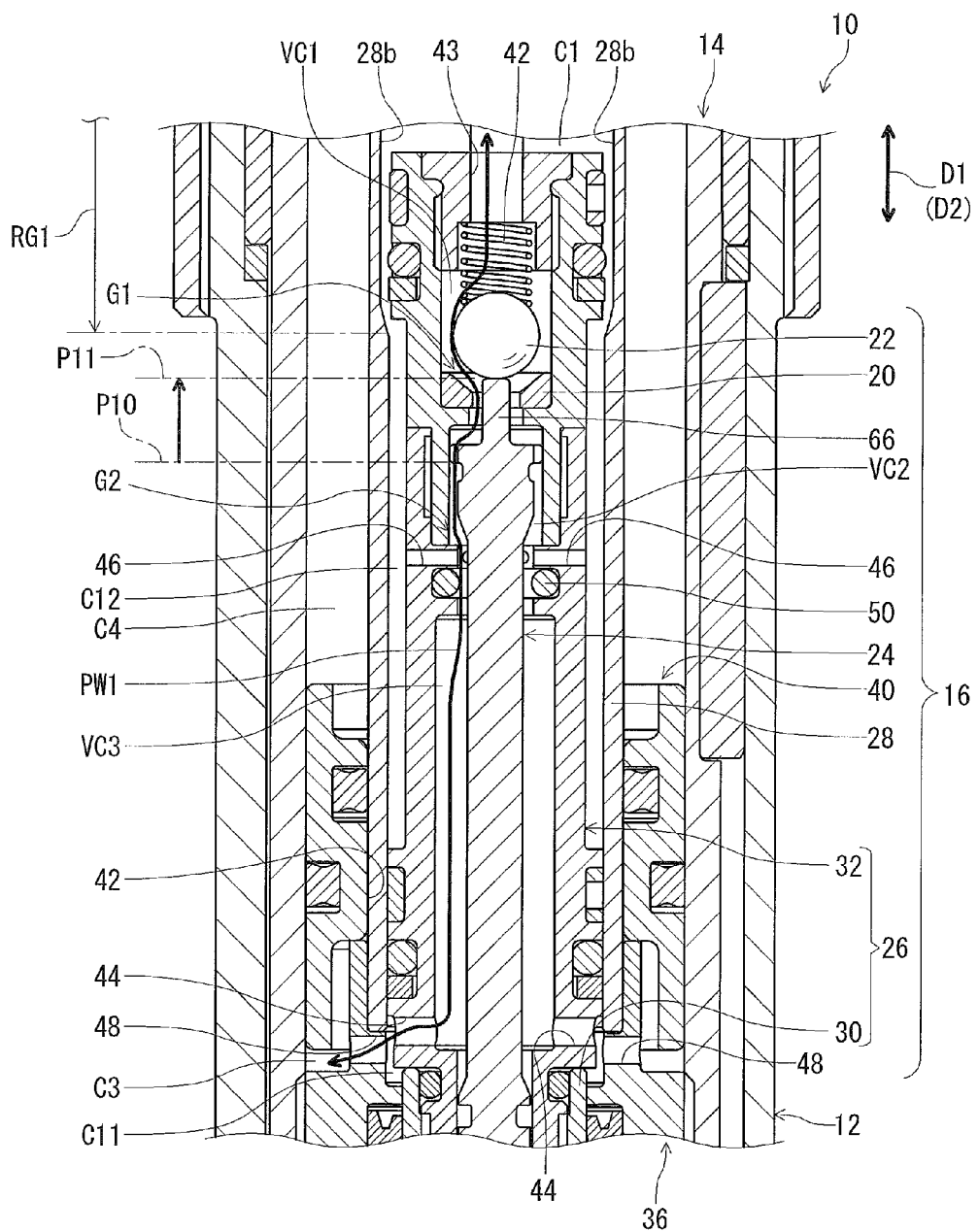
FIG. 4 is an enlarged partial cross-sectional view of the bicycle seatpost assembly illustrated in FIG. 1 (a first open position)
Figure 5:
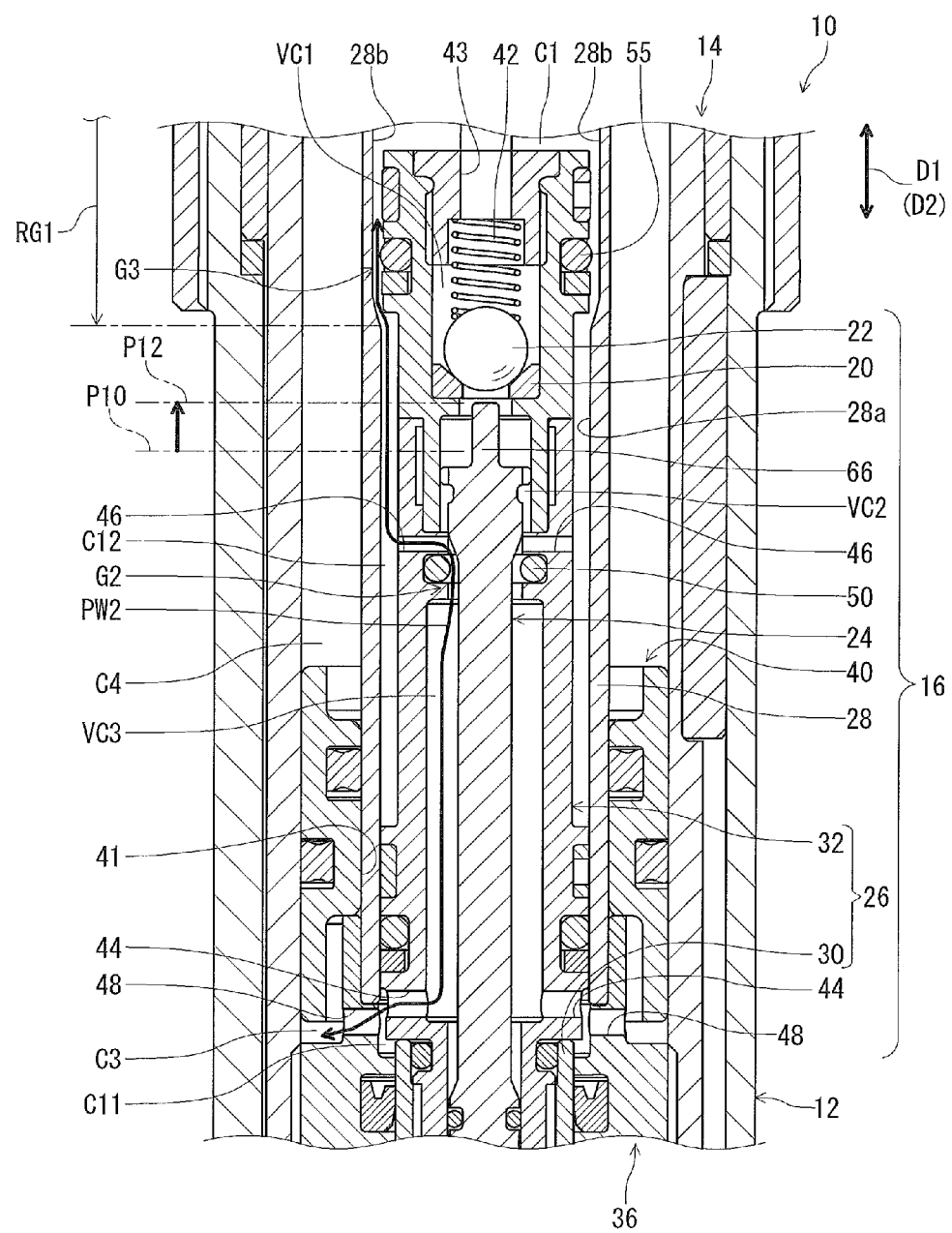
FIG. 5 is an enlarged partial cross-sectional view of the bicycle seatpost assembly illustrated in FIG. 1 (a second open position)

As seen in FIGS. 3 and 4, the first seal member 22 is configured to provide a first gate G1 of a first passageway PW1 together with the receiving member 20. The first seal member 22 is contactable with the receiving member 20 to close the first gate G1. The movable member 24 is configured to move the first seal member 22 relative to the receiving member 20 to open the first gate G1. The first valve chamber VC1 is in communication with the second valve chamber VC2 via the first gate G1 in a state where the first gate G1 is open.

The movable member 24 is movable relative to the support member 26 between the closed position P10 where the first seal member 22 is in contact with the receiving member 20 to close the first gate G1, and the first open position P11 where the movable member 24 moves the first seal member 22 so that the first seal member 22 is spaced apart from the receiving member 20 to open the first gate G1.

In the illustrated embodiment, the movable member 24 is configured to press the first seal member 22 to move away from the receiving member 20 so that the first gate G1 is open. The movable member 24 can be configured to pull the first seal member 22 to move away from the receiving member 20 if needed and/or desired. In such an embodiment, for example, the first seal member 22 is provided on the same side as the movable member 24 relative to the receiving member 20.

As seen in FIG. 4, the first passageway PW1 is configured to connect the first chamber C1 to the third chamber C3. More specifically, the support member 26 includes a first through-hole 43, second through-holes 44, and third through-holes 46. The first through-hole 43 is configured to connect the first chamber C1 to the first valve chamber VC1. The second through-holes 44 are configured to connect the third valve chamber VC3 to the first intermediate chamber C11. The third through-holes 46 are configured to connect the third valve chamber VC3 to the second intermediate chamber C12. The sealing structure 36 includes fourth through-holes 48 configured to connect the first intermediate chamber C11 to the third chamber C3. The first passageway PW1 includes the first through-hole 43, the first to third valve chambers VC1 to VC3, the second through-holes 44, the first intermediate chamber C11, and the fourth through-holes 48.

As seen in FIG. 3, the positioning structure 16 includes a second seal member 50. The movable member 24 is contactable with the second seal member 50. The second seal member 50 is provided between the second valve chamber VC2 and the third valve chamber VC3. As seen in FIG. 5, the second seal member 50 is configured to provide a second gate G2 of a second passageway PW2 together with the movable member 24. The second valve chamber VC2 is in communication with the third valve chamber VC3 via the second gate G2 in a state where the second gate G2 is open. In the illustrated embodiment, the second seal member 50 is a seal ring such as an O-ring made of elastic material such as rubber.

As seen in FIGS. 3 and 5, the movable member 24 is movable relative to the support member 26 between the closed position P10 where the movable member 24 is in contact with the second seal member 50 to close the second gate G2, and the second open position P12 where the movable member 24 is spaced apart from the second seal member 50 to open the second gate G2.

As seen in FIG. 5, the second passageway PW2 is at least partially provided radially outward of the support member 26. In the illustrated embodiment, the second passageway PW2 is at least partially provided radially outward of the support member 26 in the movement direction D2 of the movable member 24. The second passageway PW2 includes the second intermediate chamber C12, the third through-holes 46, the third valve chamber VC3, the second through-holes 44, the first intermediate chamber C11, and the fourth through-holes 48.

The movable member 24 is configured to be provided at the second open position P12 so that the first seal member 22 is in contact with the receiving member 20 to close the first gate G1. The movable member 24 is spaced apart from the first seal member 22 in a state where the movable member 24 is disposed at the second open position P12.

As seen in FIG. 4, the movable member 24 is configured to be provided at the first open position P11 so that the movable member 24 is spaced apart from the second seal member 50 to open the second gate G2. The first gate G1 and the second gate G2 are open so that the first passageway PW1 connects the first chamber C1 to the third chamber C3 in the state where the movable member 24 is disposed at the first open position P11. Namely, it can be said that the second gate G2 is provided on the first passageway PW1 in addition to the first gate G1.

Figure 6:
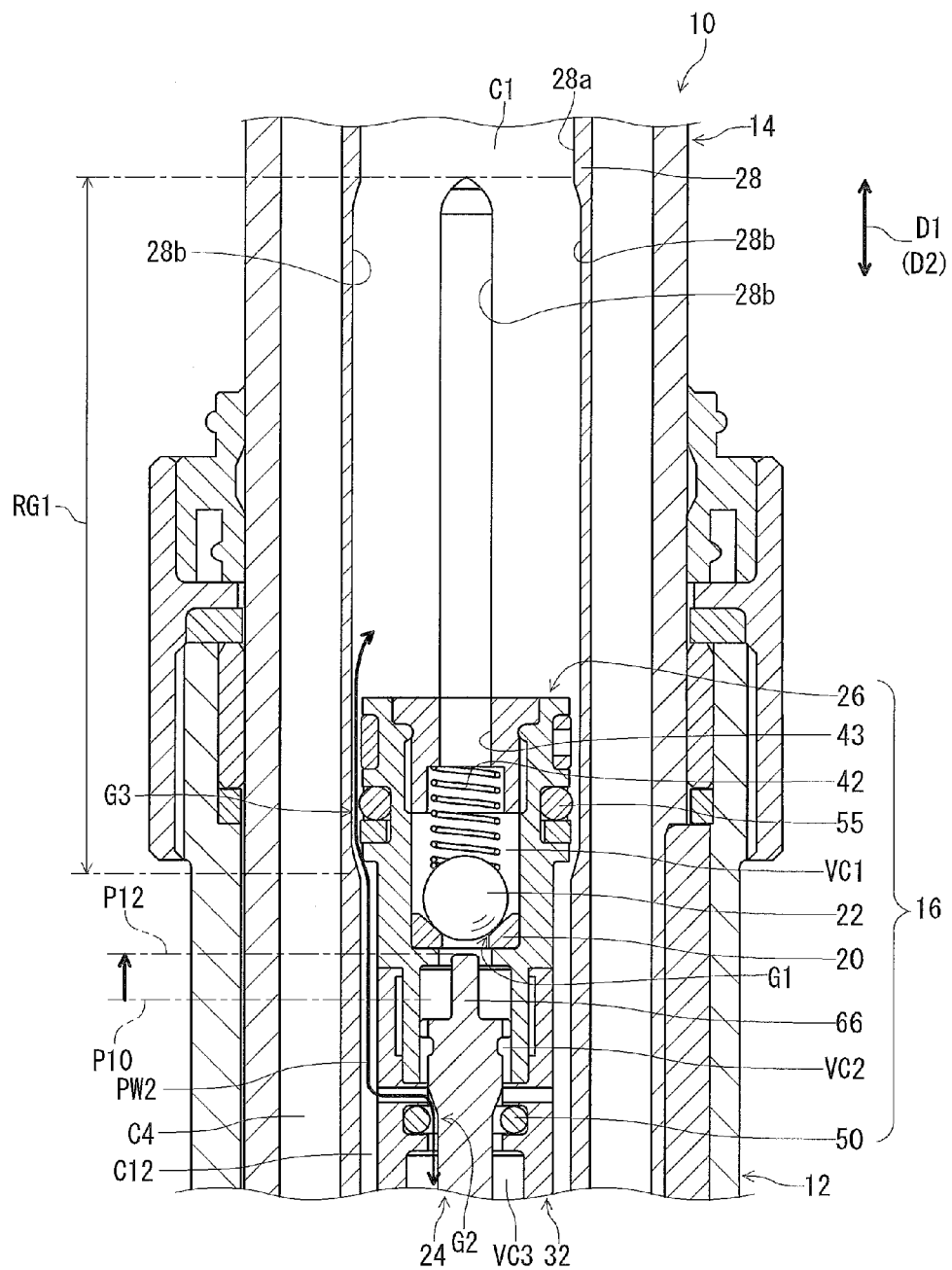
FIG. 6 is an enlarged partial cross-sectional view of the bicycle seatpost assembly illustrated in FIG. 1 (the second open position)

As seen in FIG. 6, the inner tube 28 includes an inner peripheral surface 28a and a recesses 28b recessed from the inner peripheral surface 28a. The positioning structure 16 includes a third seal member 55 provided on an outer periphery of the support member 26. In the illustrated embodiment, the third seal member 55 is a seal ring such as an O-ring made of elastic material such as rubber.

The recesses 28b extend in the telescopic direction D1 and are circumferentially spaced apart from each other. The third seal member 55 is contactable with the inner peripheral surface 28a of the inner tube 28. The third seal member 55 is configured to provide a third gate G3 of the second passageway PW2 between the third seal member 55 and the inner tube 28. The third gate G3 is open in a state where the third seal member 55 is disposed within a range RG1 where the recesses 28b are provided.

Figure 7:
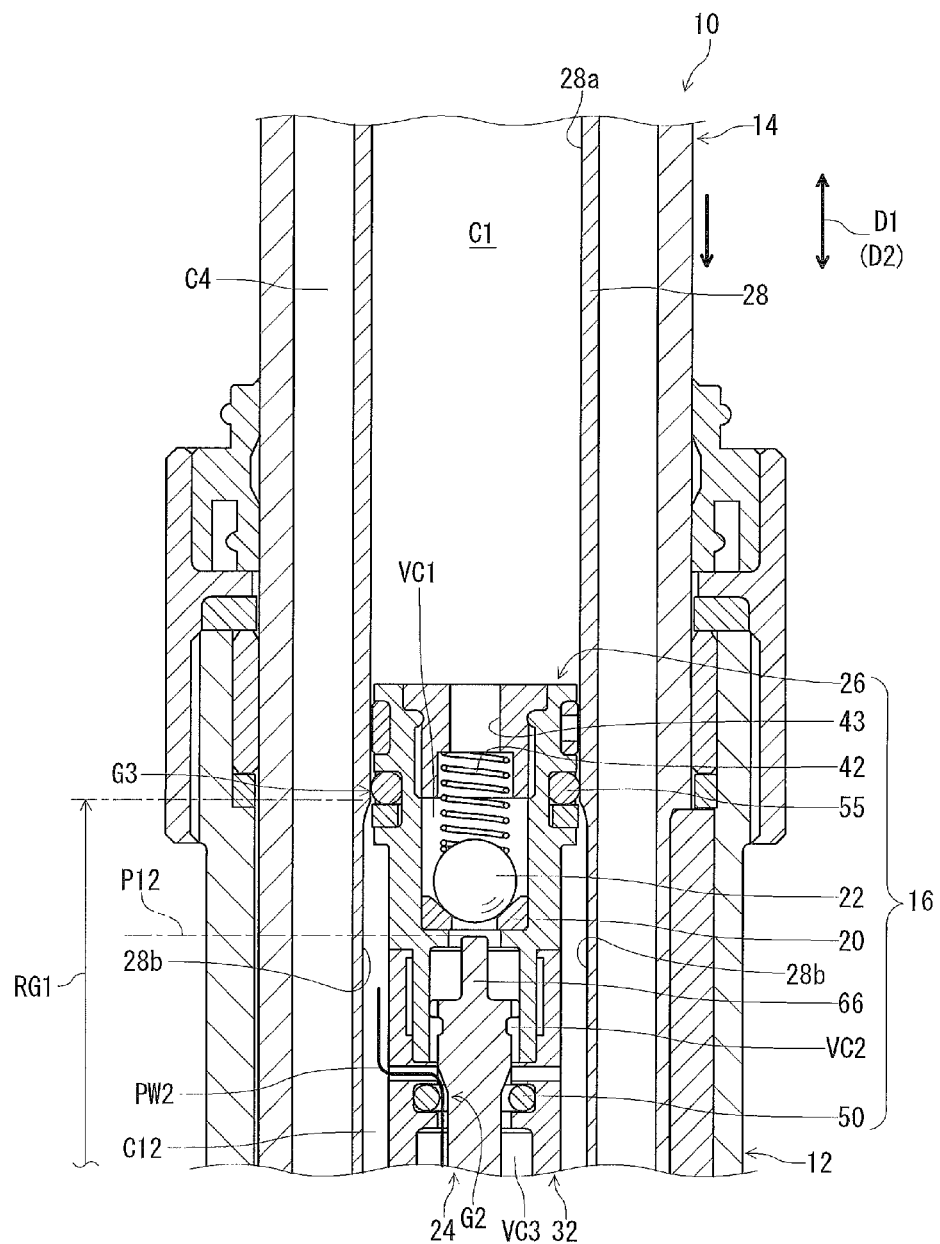
FIG. 7 is an enlarged partial cross-sectional view of the bicycle seatpost assembly illustrated in FIG. 1 (the second open position)

As seen in FIG. 7, the third gate G3 is closed in a state where the third seal member 55 is disposed outside the range RG1. For example, the third seal member 55 is in contact with the inner peripheral surface 28a of the inner tube 28 along an inner whole periphery of the inner tube 28 in a state where the third seal member 55 is disposed on an upper side of the recesses 28b. In this state, the third gate G3 is closed so that the first chamber C1 is not in communication with the third chamber C3 via the second passageway PW2. In this state, the total length of the bicycle seatpost assembly 10 is the intermediate overall length L2 (FIG. 1).

While the recesses 28b has a shape such as a groove extending in the telescopic direction D1 in the illustrated embodiment, the recesses 28b can have shapes other than the grooves if needed and/or desired. For example, the recesses 28b can circumferentially connected with each other to provide an annular shape along the inner whole periphery of the inner tube 28. Furthermore, the inner tube 28 can include at least one recess 28b if needed and/or desired.

Figure 8:
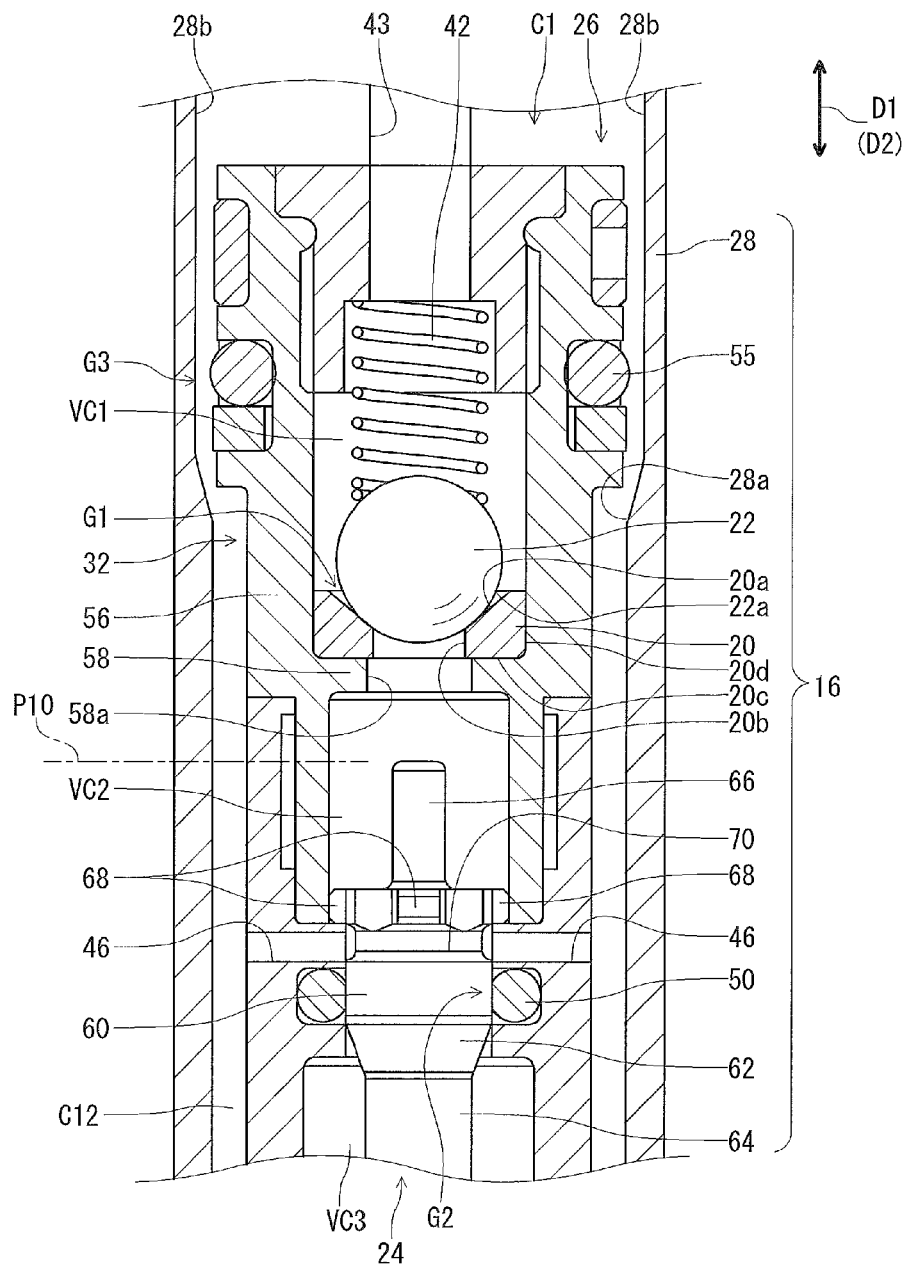
FIG. 8 is an enlarged partial cross-sectional view of the bicycle seatpost assembly illustrated in FIG. 1 (the closed position)

As seen in FIG. 8, the first seal member 22 includes a spherical surface 22a contactable with the receiving member 20 to close the first gate G1. In the illustrated embodiment, the first seal member 22 is a sphere. In the present application, the term "spherical surface" can encompass a complete spherical surface and an ellipsoidal spherical surface, and the term "sphere" can encompass a complete sphere and an ellipsoidal sphere. In the illustrated embodiment, the spherical surface 22a is a complete spherical surface, and the first seal member 22 is a complete sphere. The first seal member 22 can have a shape other than the sphere if needed and/or desired.

As seen in FIG. 8, the receiving member 20 includes a tapered surface 20a contactable with the spherical surface 22a. The receiving member 20 has an annular shape. The receiving member 20 includes an opening 20b, an attachment surface 20c, and an outer peripheral surface 20d. The tapered surface 20a is opposite to the attachment surface 20c in the telescopic direction D1. The tapered surface 20a is inclined relative to the telescopic direction D1. More specifically, the tapered surface 20a is inclined relative to the telescopic direction D1 so that a distance between the tapered surface 20a and the attachment surface 20c increases from the opening 20b to the outer peripheral surface 20d. The receiving member 20 can have a shape other than the illustrated shape if needed and/or desired. The tapered surface 20a can have a spherical surface complementary to a profile of the first seal member 22.

The receiving member 20 is made of a first material comprising a resin material. The first seal member 22 is made of a second material comprising a metallic material. The first material can include material other than resin material in addition to the resin material. The second material can include material other than the metallic material in addition to the metallic material. Furthermore, the receiving member 20 can be made of material other than the first material. The first seal member 22 can be made of material other than the second material.

As seen in FIG. 8, the receiving member 20 is a separate member from the support member 26. More specifically, the receiving member 20 is a separate member from the valve support 32 of the support member 26. The receiving member 20 can be integrally provided with the support member 26 (the valve support 32) if needed and/or desired.

The support member 26 includes a tubular part 56 and a flange part 58. The flange part 58 protrudes radially inward from an inner peripheral surface of the tubular part 56. The tubular part 56 and the flange part 58 define the first valve chamber VC1.

As seen in FIG. 8, the receiving member 20 is attached to the inner peripheral surface of the tubular part 56 and the flange part 58. The flange part 58 has an annular shape. The flange part 58 includes an opening 58a. The opening 58a is adjacent to the opening 20b of the receiving member 20. The openings 58a and 20b partially constitute the first passageway PW1 (FIG. 4). The openings 20b and 58a are configured to connect the first valve chamber VC1 to the second valve chamber VC2 in a state where the first seal member 22 is spaced apart from the receiving member 20.

The movable member 24 includes a contact portion 60, a tapered portion 62, and a rod portion 64. The contact portion 60 is contactable with the second seal member 50. The contact portion 60 is in contact with the second seal member 50 to close the second gate G2 in the closed state where the movable member 24 is disposed at the closed position P10. The rod portion 64 extends in the telescopic direction D1. The tapered portion 62 is provided between the contact portion 60 and the rod portion 64. The tapered portion 62 includes a tapered peripheral surface 62a. The tapered peripheral surface 62a is inclined relative to the telescopic direction D1 so that an outer diameter of the tapered portion 62 decreases from the contact portion 60 to the rod portion 64. The tapered peripheral surface 62a is radially spaced apart from the second seal member 50 in the first or second open state where the movable member 24 is disposed at each of the first open position P11 and the second open position P12 (FIGS. 4 and 5).

As seen in FIG. 8, the movable member 24 includes a pressing portion 66 extending from the contact portion 60 toward the first seal member 22 in the telescopic direction D1. The pressing portion 66 is configured to press the first seal member 22 to move away from the receiving member 20 in the telescopic direction D1. More specifically, the pressing portion 66 is configured to be inserted in the openings 20b and 58a in the telescopic direction D1.

As seen in FIG. 4, the pressing portion 66 is inserted in the openings 20b and 58a in the telescopic direction D1 in the first open state where the movable member 24 is disposed at the first open position P11. As seen in FIG. 5, the pressing portion 66 is at least partially inserted in the opening 58a in the telescopic direction D1 in the second open state where the movable member 24 is disposed at the second open position P12.

As seen in FIG. 8, the movable member 24 includes protruding portions 68. The protruding portions 68 protrude radially outward from the contact portion 60. The protruding portions 68 are circumferentially spaced apart from each other about the contact portion 60. The protruding portions 68 are configured to radially support the movable member 24 relative to the support member 26.

As seen in FIG. 8, the movable member 24 includes a communication groove 70 having an annular shape. The communication groove 70 is provided on an outer peripheral surface of the contact portion 60. The communication groove 70 is configured to connect the second valve chamber VC2 to the second intermediate chamber C12 via the third through-holes 46. The communication groove 70 is arranged to radially face the third through-holes 46 in the closed state where the movable member 24 is disposed at the closed position P10. A pressure in the second valve chamber VC2 is equal to a pressure in the second intermediate chamber C12 in a state where the communication groove 70 connects the second valve chamber VC2 to the second intermediate chamber C12 via the third through-holes 46.

The operation of the bicycle seatpost assembly 10 will be described in detail below.

As seen in FIG. 3, in a state where the overall length of the bicycle seatpost assembly 10 is the maximum overall length L0 (FIG. 1), the third seal member 55 is disposed radially inward of the recesses 28b of the inner tube 28. In this state, the third gate G3 is open so that the first chamber C1 is in communicate with the second intermediate chamber C12 via the third gate G3. The first chamber C1 is in communication with the second valve chamber VC2 via the third gate G3, the second intermediate chamber C12, and the third through-holes 46 in the closed state where the movable member 24 is positioned at the closed position P10.

As seen in FIG. 5, when the movable member 24 is moved from the closed position P10 to the second open position P12 in response to the second operation of the operating device 2, the second gate G2 is open so that the first chamber C1 is in communication with the third chamber C3 via the second passageway PW2. This allows the substantially incompressible fluid to flow between the first chamber C1 and the third chamber C3 via the second passageway PW2.

When the rider's weight is applied to the second cylinder 14 via the seat attachment portion 18 (FIG. 1), fluid pressure increases in the first chamber C1. This causes the substantially incompressible fluid to flow from the first chamber C1 to the third chamber C3 via the second passageway PW2. At this time, the piston 40 is pressed toward the biasing chamber C4 relative to the first cylinder 12, causing the compressible fluid to be compressed in the biasing chamber C4. This allows the second cylinder 14 to be downwardly moved relative to the first cylinder 12 using the rider's weight (FIGS. 6 and 7).

On the other hand, when the rider's weight is released from the second cylinder 14, the compressible fluid compressed in the biasing chamber C4 biases the second cylinder 14 to upwardly move relative to the first cylinder 12 in the telescopic direction D1. This causes the substantially incompressible fluid to flow from the third chamber C3 to the first chamber C1 via the second passageway PW2. The second cylinder 14 is upwardly moved relative to the first cylinder 12 while the rider's weight is released from the second cylinder 14.

As seen in FIG. 3, the second gate G2 is closed when the movable member 24 returns to the closed position P10, causing the substantially incompressible fluid to stop flowing between the first chamber C1 and the third chamber C3 via the second passageway PW2 (FIG. 5). This allows the second cylinder 14 to be positioned at any position within the second adjustable range AR2 (FIG. 1) corresponding to the range RG1 of the recesses 28b.

As seen in FIG. 7, when the third seal member 55 reaches the upper side of the recesses 28b, the third seal member 55 comes in contact with the inner peripheral surface 28a of the inner tube 28 along the inner whole periphery of the inner tube 28. This causes the third gate G3 to be closed so that the substantially incompressible fluid stops flowing from the first chamber C1 to the third chamber C3. This allows the second cylinder 14 to be positioned at a position corresponding to the intermediate total length L2 (FIG. 1) relative to the first cylinder 12 by just operating the operated member 4 of the operating device 2 to the second operated position P2. The second cylinder 14 does not move relative to the first cylinder 12 in the telescopic direction D1 until the first gate G1 is open.

Figure 9:
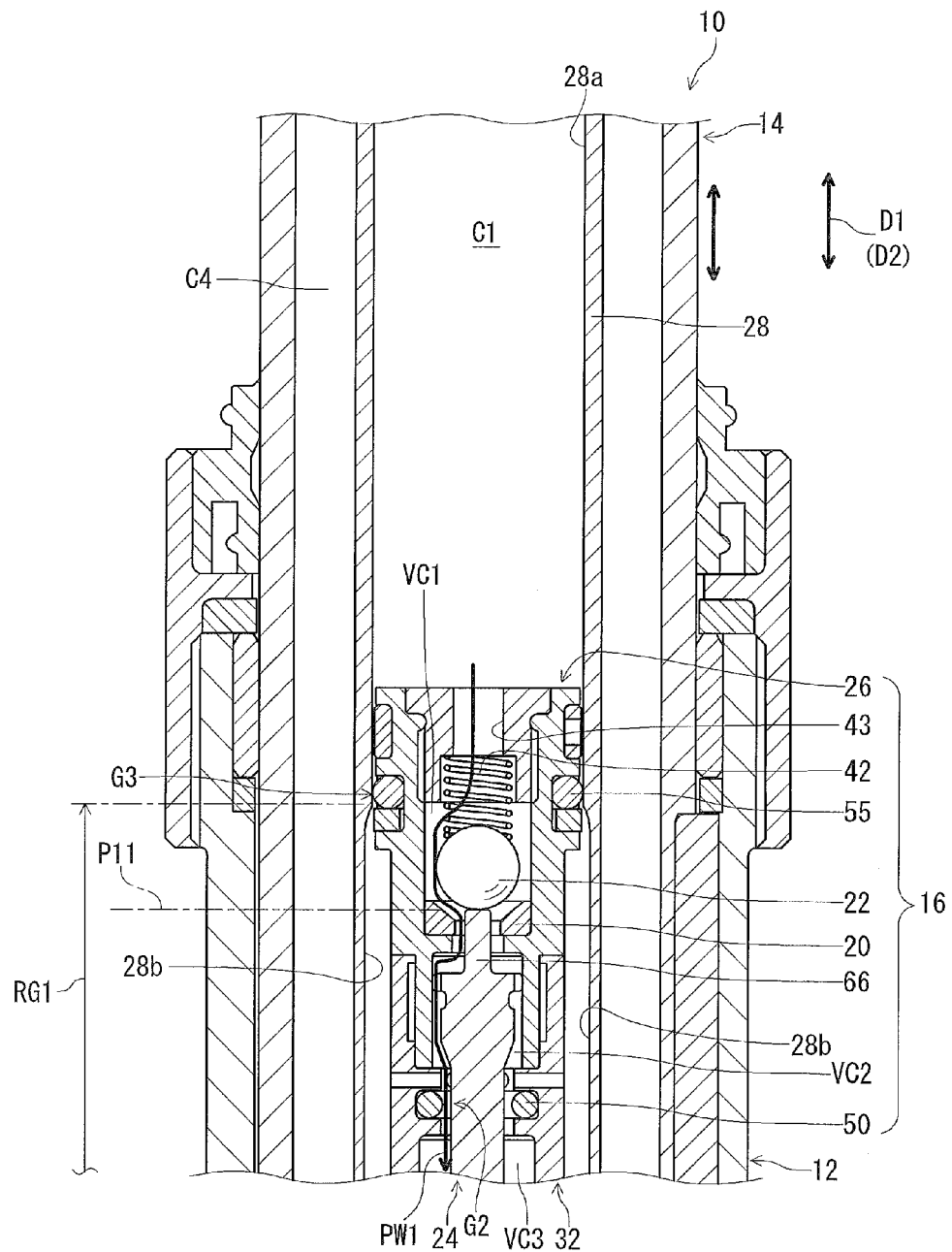
FIG. 9 is an enlarged partial cross-sectional view of the bicycle seatpost assembly illustrated in FIG. 1 (the first open position)

As seen FIGS. 4 and 9, in the first open state where the movable member 24 is positioned at the first open position P11, the first gate G1 and the second gate G2 are open so that the first chamber C1 is in communication with the third chamber C3 via the first passageway PW1. This allows the substantially incompressible fluid to flow between the first chamber C1 and the second chamber C2 via the first passageway PW1 and the second passageway PW2. However, the positioning structure 16 can have such a construction that the second passageway PW2 is closed in a state where the first passageway PW1 is open.

When the rider's weight applied to the second cylinder 14, the fluid pressure increases in the first chamber C1. This causes the substantially incompressible fluid to flow from the first chamber C1 to the third chamber C3 via the first passageway PW1. At this time, the piston 40 is pressed toward the biasing chamber C4 relative to the first cylinder 12, causing the compressible fluid to be compressed in the biasing chamber C4. This allows the second cylinder 14 to be downwardly moved relative to the first cylinder 12 using the rider's weight.

On the other hand, when the rider's weight is released from the second cylinder 14, the compressible fluid compressed in the biasing chamber C4 biases the second cylinder 14 to upwardly move relative to the first cylinder 12 in the telescopic direction D1. This causes the substantially incompressible fluid to flow from the third chamber C3 to the first chamber C1 via the first passageway PW1. The second cylinder 14 is upwardly moved relative to the first cylinder 12 while the rider's weight is released from the second cylinder 14.

The first gate G1 and the second gate G2 are closed when the movable member 24 returns to the closed position P10 (FIG. 3), causing the substantially incompressible fluid to stop flowing between the first chamber C1 and the third chamber C3 via the first passageway PW1 (FIG. 4). Accordingly, a relative position between the first cylinder 12 and the second cylinder 14 can be continuously adjusted regardless of the recesses 28b in the first open state where the movable member 24 is disposed at the first open position P11.

With the bicycle seatpost assembly 10, since the first seal member 22 includes the spherical surface 22a contactable with the receiving member 20 to close the first gate G1, it is possible to improve sealing between the first seal member 22 and the receiving member 20. Furthermore, since the movable member 24 is configured to move the first seal member 22 relative to the receiving member 20 to open the first gate G1, it is possible to easily open the first gate G1.

With the bicycle seatpost assembly 10, the first seal member 22 is contactable with the receiving member 20 to close the first gate G1 of the first passageway PW1. The movable member 24 is configured to move the first seal member 22 relative to the receiving member 20 to open the first gate G1. Since the first seal member 22 includes the spherical surface 22a, the first seal member 22 can tightly shut the first gate G1 with the receiving member 20. Further, the tapered surface 20a of the receiving member 20 can tightly contact the first seal member 22 because the tapered surface 20a can linearly contact the spherical surface 22a of the first seal member 22. Furthermore, since the movable member 24 is a separate member from the first seal member 22, the fluid passageway in the bicycle seatpost assembly 10 can be divided into at least two different passageways in accordance with a change in a position of the movable member 24 relative to the first seal member 22.

Second Embodiment

A bicycle seatpost assembly 210 in accordance with a second embodiment will be described below referring to FIG. 10. The bicycle seatpost assembly 210 has substantially the same configuration as the bicycle seatpost assembly 10 except for the receiving member 20. Thus, elements having substantially the same function as those in the first embodiment will be numbered the same here, and will not be described and/or illustrated again in detail here for the sake of brevity.

Figure 10:
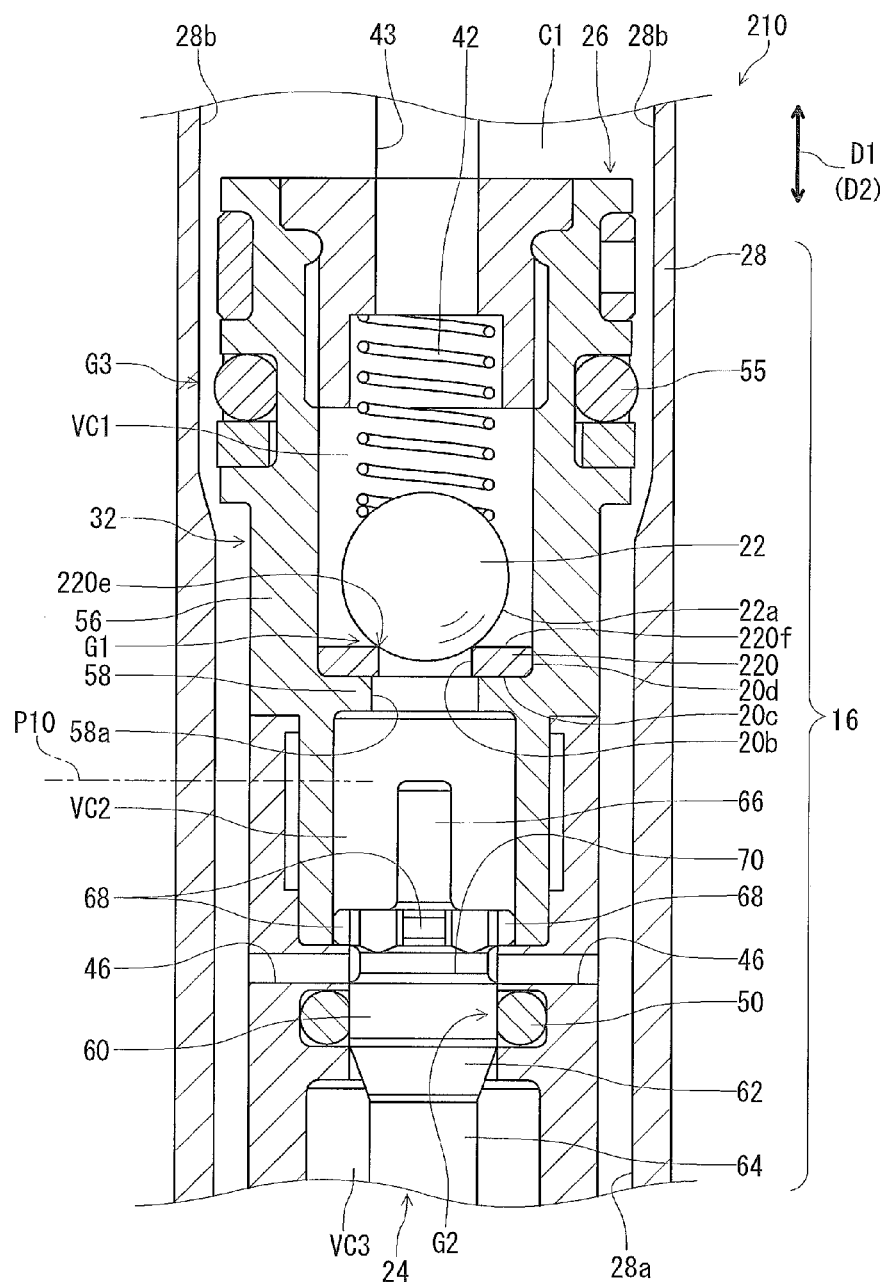
FIG. 10 is an enlarged partial cross-sectional view of a bicycle seatpost assembly in accordance with a second embodiment (the closed position)

As seen in FIG. 10, a receiving member 220 of the bicycle seatpost assembly 210 includes an annular edge 220e instead of the tapered surface 20a. The annular edge 220e is contactable with the first seal member 22. More specifically, the receiving member 220 includes the opening 20b, the attachment surface 20c, the outer peripheral surface 20d, and an annular surface 220f. The annular surface 220f is opposite to the attachment surface 20c. The annular edge 220e is provided by the annular surface 220f and an inner peripheral surface of the opening 20b. It can be said that the tapered surface 20a can be omitted from the receiving member 20 in accordance with the first embodiment if needed and/or desired.

Third Embodiment

A bicycle seatpost assembly 310 in accordance with a third embodiment will be described below referring to FIG. 11. The bicycle seatpost assembly 310 has substantially the same configuration as the bicycle seatpost assembly 10 except for the receiving member 20. Thus, elements having substantially the same function as those in the first embodiment will be numbered the same here, and will not be described and/or illustrated again in detail here for the sake of brevity.

Figure 11:
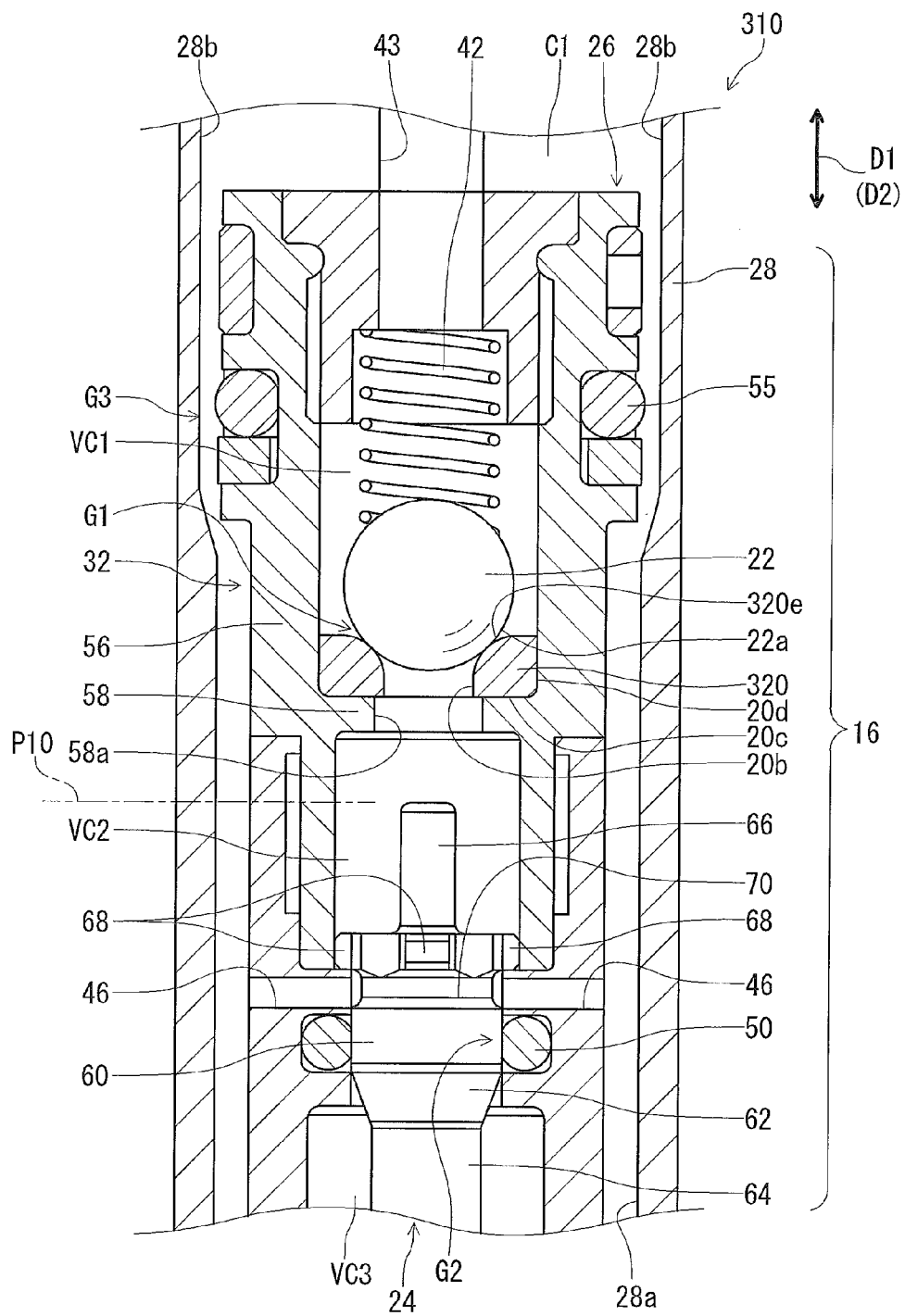
FIG. 11 is an enlarged partial cross-sectional view of a bicycle seatpost assembly in accordance with a third embodiment (the closed position).

As seen in FIG. 11, a receiving member 320 of the bicycle seatpost assembly 310 includes a curved surface 320e instead of the tapered surface 20a. The curved surface 320e is contactable with the first seal member 22. The curved surface 320e is inclined relative to the telescopic direction D1. More specifically, the curved surface 320e is inclined relative to the telescopic direction D1 so that a distance between the curved surface 320e and the attachment surface 20c increases from the opening 20b to the outer peripheral surface 20d. The curved surface 320e protrudes toward the first seal member 22.

With the bicycle seatpost assembly 310, it is possible to obtain substantially the same advantageous effect as that of the bicycle seatpost assembly 10 in accordance with the first embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle seatpost assembly comprising:
a first cylinder;
a second cylinder configured to be telescopically received in the first cylinder; and
a positioning structure configured to relatively position the first cylinder and the second cylinder, the positioning structure including
a receiving member,
a first seal member configured to provide a first gate of a first passageway together with the receiving member, the first seal member including a spherical surface directly contactable with the receiving member to close the first gate, and
a movable member configured to move the first seal member relative to the receiving member to open the first gate.

2. The bicycle seatpost assembly according to claim 1, wherein
the receiving member includes a tapered surface contactable with the spherical surface.

3. The bicycle seatpost assembly according to claim 1, wherein
the receiving member is made of a first material comprising a resin material.

4. The bicycle seatpost assembly according to claim 1, wherein
the first seal member is made of a second material comprising a metallic material.

5. The bicycle seatpost assembly according to claim 1, wherein
the first seal member is a sphere.

6. The bicycle seatpost assembly according to claim 1, wherein
the movable member is a separate member from the first seal member.

7. The bicycle seatpost assembly according to claim 1, wherein
the movable member is configured to press the first seal member to move away from the receiving member so that the first gate is open.

8. The bicycle seatpost assembly according to claim 1, wherein
the first seal member is provided on an opposite side of the movable member relative to the receiving member.

9. The bicycle seatpost assembly according to claim 1, wherein
the movable member has a closed position where the movable member is spaced apart from the first seal member so that the spherical surface is in contact with the receiving member to close the first gate.

10. The bicycle seatpost assembly according to claim 9, wherein
the first seal member is provided on an opposite side of the movable member relative to the receiving member in a closed state where the movable member is at the closed position.

11. A bicycle seatpost assembly comprising:
a first cylinder;
a second cylinder configured to be telescopically received in the first cylinder; and
a positioning structure configured to relatively position the first cylinder and the second cylinder, the positioning structure including
a receiving member,
a first seal member configured to provide a first gate of a first passageway together with the receiving member, the first seal member including a spherical surface contactable with the receiving member to close the first gate, and
a movable member configured to move the first seal member relative to the receiving member to open the first gate, wherein
the positioning structure includes a valve biasing member configured to bias the first seal member toward the receiving member so that the spherical surface is in contact with the receiving member.

12. A bicycle seatpost assembly comprising:
a first cylinder;
a second cylinder configured to be telescopically received in the first cylinder; and
a positioning structure configured to relatively position the first cylinder and the second cylinder, the positioning structure including
a receiving member,
a first seal member configured to provide a first gate of a first passageway together with the receiving member, the first seal member including a spherical surface contactable with the receiving member to close the first gate, and a movable member configured to move the first seal member relative to the receiving member to open the first gate, wherein the first seal member is provided on an opposite side of the movable member relative to the receiving member, and the positioning structure includes a valve biasing member configured to bias the first seal member toward the receiving member so that the spherical surface is in contact with the receiving member.

13. A bicycle seatpost assembly comprising:
a first cylinder;
a second cylinder configured to be telescopically received in the first cylinder; and
a positioning structure configured to relatively position the first cylinder and the second cylinder, the positioning structure including
a receiving member,
a first seal member configured to provide a first gate of a first passageway together with the receiving member, the first seal member including a spherical surface contactable with the receiving member to close the first gate, and
a movable member configured to move the first seal member relative to the receiving member to open the first gate, wherein
the positioning structure includes a support member configured to movably support the movable member, and
the movable member is movable relative to the support member between
a closed position where the first seal member is in contact with the receiving member to close the first gate, and
a first open position where the movable member moves the first seal member so that the first seal member is spaced apart from the receiving member to open the first gate.

14. The bicycle seatpost assembly according to claim 13, wherein
the positioning structure includes a second seal member configured to provide a second gate of a second passageway together with the movable member,
the movable member is movable relative to the support member between
the closed position where the movable member is in contact with the second seal member to close the second gate, and
a second open position where the movable member is spaced apart from the second seal member to open the second gate, and
the movable member is configured to be provided at the second open position so that the first seal member is in contact with the receiving member to close the first gate.

15. The bicycle seatpost assembly according to claim 14, wherein
the second open position is provided between the closed position and the first open position in a movement direction of the movable member.

16. The bicycle seatpost assembly according to claim 14, wherein
the support member has a tubular shape,
the movable member is movably provided in the support member, and
the second passageway is at least partially provided radially outward of the support member.

17. A bicycle seatpost assembly comprising:
a receiving member;
a first seal member configured to provide a first gate of a first passageway together with the receiving member, the first seal member being contactable with the receiving member to close the first gate; and
a movable member configured to directly contact the first seal member to move the first seal member relative to the receiving member to open the first gate, the movable member being a separate member from the first seal member, the movable member having a closed position where the movable member is spaced apart from the first seal member so that the first seal member is in contact with the receiving member to close the first gate.

18. The bicycle seatpost assembly according to claim 17, wherein
the movable member is configured to press the first seal member to move away from the receiving member so that the first gate is open.

19. A bicycle seatpost assembly comprising:
a receiving member;
a first seal member configured to provide a first gate of a first passageway together with the receiving member, the first seal member being contactable with the receiving member to close the first gate;
a movable member configured to move the first seal member relative to the receiving member to open the first gate, the movable member being a separate member from the first seal member; and
a valve biasing member configured to bias the first seal member toward the receiving member so that the first seal member is in contact with the receiving member.

20. The bicycle seatpost assembly according to claim 17, wherein
the first seal member is provided on an opposite side of the movable member relative to the receiving member in a closed state where the movable member is at the closed position.

21. A bicycle seatpost assembly comprising:
a receiving member;
a first seal member configured to provide a first gate of a first passageway together with the receiving member, the first seal member being contactable with the receiving member to close the first gate; and
a movable member configured to move the first seal member relative to the receiving member to open the first gate, the movable member being a separate member from the first seal member, the movable member having a closed position where the movable member is spaced apart from the first seal member so that the first seal member is in contact with the receiving member to close the first gate,
wherein the first seal member is provided on an opposite side of the movable member relative to the receiving member in a closed state where the movable member is at the closed position, further comprising:
a valve biasing member configured to bias the first seal member toward the receiving member so that the first seal member is in contact with the receiving member.

22. A bicycle seatpost assembly comprising:
a receiving member;
a first seal member configured to provide a first gate of a first passageway together with the receiving member, the first seal member being contactable with the receiving member to close the first gate;

a movable member configured to move the first seal member relative to the receiving member to open the first gate, the movable member being a separate member from the first seal member; and a support member configured to movably support the movable member, the movable member being movable relative to the support member between a closed position where the first seal member is in contact with the receiving member to close the first gate, and a first open position where the movable member moves the first seal member so that the first seal member is spaced apart from the receiving member to open the first gate.

23. The bicycle seatpost assembly according to claim 22, further comprising:

a second seal member configured to provide a second gate of a second passageway together with the movable member, wherein the movable member is movable relative to the support member between the closed position where the movable member is in contact with the second seal member to close the second gate, and a second open position where the movable member is spaced apart from the second seal member to open the second gate, and the movable member is configured to be provided at the second open position so that the first seal member is in contact with the receiving member to close the first gate.

24. The bicycle seatpost assembly according to claim 23, wherein the second open position is provided between the closed position and the first open position in a movement direction of the movable member.

25. The bicycle seatpost assembly according to claim 23, wherein the support member has a tubular shape, the movable member is movably provided in the support member, and the second passageway is at least partially provided radially outward of the support member in a movement direction of the movable member.

* * * * *